(12) United States Patent
Feng et al.

(10) Patent No.: US 12,128,569 B2
(45) Date of Patent: Oct. 29, 2024

(54) METHOD AND APPARATUS FOR MANAGING ROBOT ARM

(71) Applicant: ABB Schweiz AG, Baden (CH)

(72) Inventors: Tao Feng, Shanghai (CN); Xiao Xu, Shanghai (CN)

(73) Assignee: ABB Schweiz AG, Baden (CH)

( * ) Notice: Subject to any disclaimer, the term of this patent is extended or adjusted under 35 U.S.C. 154(b) by 385 days.

(21) Appl. No.: 17/416,136

(22) PCT Filed: Jan. 23, 2019

(86) PCT No.: PCT/CN2019/072846
§ 371 (c)(1),
(2) Date: Jun. 18, 2021

(87) PCT Pub. No.: WO2020/150929
PCT Pub. Date: Jul. 30, 2020

(65) Prior Publication Data
US 2022/0055218 A1 Feb. 24, 2022

(51) Int. Cl.
B25J 9/00 (2006.01)
B25J 9/16 (2006.01)
B25J 13/08 (2006.01)

(52) U.S. Cl.
CPC ........... *B25J 9/1692* (2013.01); *B25J 13/089* (2013.01)

(58) Field of Classification Search
CPC ........ B25J 9/1692; B25J 13/089; B25J 19/02; G05B 2219/41091
See application file for complete search history.

(56) References Cited

U.S. PATENT DOCUMENTS 4,757,458 A 7/1988 Takemoto et al.
4,980,839 A 12/1990 Souji et al.
(Continued)

FOREIGN PATENT DOCUMENTS

CN 103068534 A 4/2013
CN 104827480 A 8/2015
(Continued)

OTHER PUBLICATIONS

CN108568839AZeroReturningDeviceForScaraCylindricalPairJoint andMethodOfZeroReturningDevice.pdf, Zhang (Year: 2018).*
(Continued)

*Primary Examiner* — Jonathan L Sample
*Assistant Examiner* — Shaheda Shabnam Hoque
(74) *Attorney, Agent, or Firm* — Leydig, Voit & Mayer, Ltd.

(57) ABSTRACT

Methods for managing a robot arm are disclosed. In one method, during a movement of the robot arm in an axis thereof, a signal collected by a sensor equipped at a frame of the robot arm is received. A change in strength of the received signal is detected, where the change is caused by an offset between a position of a reference mark equipped at the robot arm and a position of the sensor. An original point of the axis of the robot arm is determined based on the detected change. Further, robot systems, apparatuses, systems, and computer readable media for managing a robot arm in the robot systems are disclosed. The original point of the axis of the robot arm may be determined without a dedicated calibrating tool, and then the robot arm may be calibrated based on the original point accurately.

24 Claims, 8 Drawing Sheets

(56) References Cited

U.S. PATENT DOCUMENTS

| | | | |
|---|---|---|---|
| 2014/0331807 A1 | | 11/2014 | Kitahara et al. |
| 2015/0266183 A1* | | 9/2015 | Alifragkis .............. B25J 9/1692 700/254 |
| 2016/0059417 A1 | | 3/2016 | Shirakyan et al. |
| 2016/0346932 A1 | | 12/2016 | Deng et al. |

FOREIGN PATENT DOCUMENTS

| | | | |
|---|---|---|---|
| CN | 106461383 A | | 2/2017 |
| CN | 107053216 A | | 8/2017 |
| CN | 108568839 A | | 9/2018 |
| CN | 108858287 A | | 11/2018 |
| JP | 61-75404 A | | 4/1986 |
| JP | 4-111794 A | | 4/1992 |
| JP | 6-285747 A | | 10/1994 |
| JP | 9-66487 A | | 3/1997 |
| JP | 2003-220587 A | | 8/2003 |
| JP | 2015-145052 A | | 8/2015 |
| JP | 2016218063 A | * | 12/2016 |
| WO | WO 2018/196232 A1 | | 1/2018 |

OTHER PUBLICATIONS

JP2003220587A_CalibrationMethodForIndustrialRobot.pdf, Murata (Year: 2003).*
JP2016218063AProximitySensor.pdf, Imai (Year: 2016).*
JP2003220587A_CalibrationMethodForIndustrialRobot (Year: 2003).*
JP2003220587A_CalibrationMethodForIndustrialRobot_Image (Year: 2003).*
M. Braae, "A robot arm for a first course in control engineering," in IEEE Transactions on Education, vol. 39, No. 1, pp. 40-45, Feb. 1996 (Year: 1996).*
JPH0493190A (Year: 1992).*
JPH0493190A_Image (Year: 1992).*
ABB Inc., "5.4.4 Calibrating axis 3 and axis 4," *Product Manual—IRB* 910SC, 365-370 (2017).
Chinese National Intellectual Property Administration, International Search Report in International Patent Application No. PCT/CN2019/072846, 5 pp. (Oct. 28, 2019).
Chinese National Intellectual Property Administration, Written Opinion in International Patent Application No. PCT/CN2019/072846, 4 pp. (Oct. 28, 2019).
European Patent Office, Extended European Search Report in European Patent Application No. 19911683.1, 11 pp. (Jul. 28, 2022).

* cited by examiner

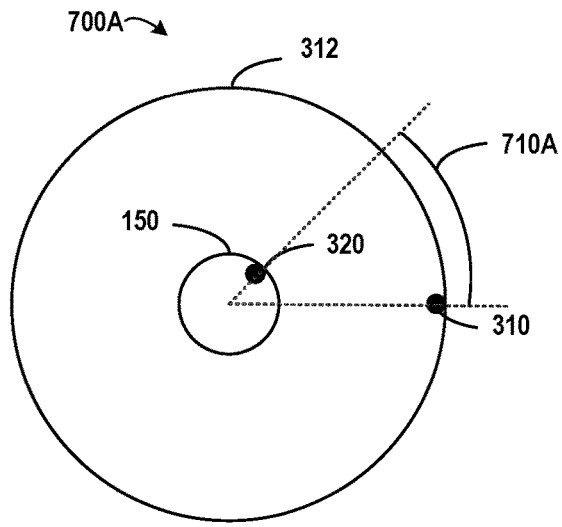 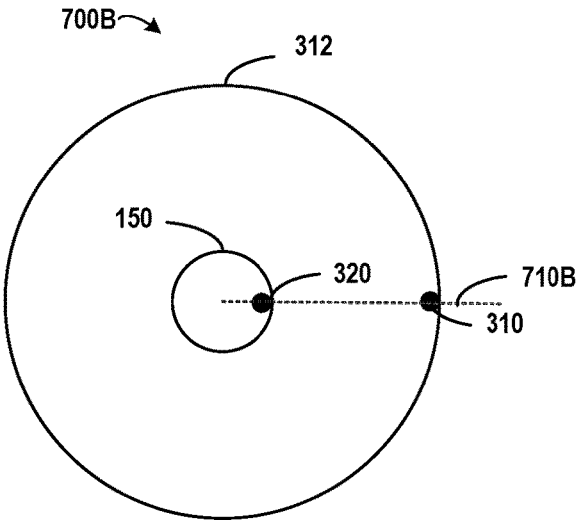
FIG. 7A  FIG. 7B
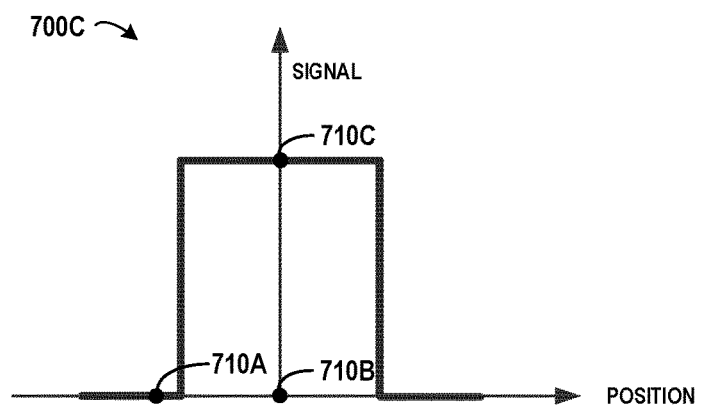
FIG. 7C

METHOD AND APPARATUS FOR MANAGING ROBOT ARM

CROSS-REFERENCE TO RELATED APPLICATIONS

This patent application is a U.S. national phase patent application of International Patent Application No. PCT/CN2019/072846, filed Jan. 23, 2019, which is fully incorporated herein by reference for all purposes.

FIELD

Example embodiments of the present disclosure generally relate to a robot system, and more specifically, to methods, apparatuses, systems and computer readable media for managing a robot arm in the robot system.

BACKGROUND

With developments of computer and automatic control, robot systems have been widely used to process various types of objects in the manufacturing industry. Typically, a robot system may have a plurality of mechanical robot arms, each of which may move within a respective predetermined range. In order to enable the robot system to accurately perform operations on the object (such as grabbing the object, measuring the size of the object, cutting the object to a predetermined shape, etc.), the robot arms should be calibrated.

There have been proposed several solutions for calibrating the robot arms. However, conventional calibrating procedures need dedicated calibrating tools. Therefore, it is desired to manage the robot arm in a more effective and convenient manner.

SUMMARY

Example embodiments of the present disclosure provide solutions for managing a robot arm.

In a first aspect, example embodiments of the present disclosure provide a method for managing a robot arm. The method may comprise: receiving, during a movement of the robot arm in an axis of the robot arm, a signal collected by a sensor equipped at a frame of the robot arm; detecting a change in strength of the received signal, the change being caused by an offset between a position of a reference mark equipped at the robot arm and a position of the sensor; and determining an original point of the axis of the robot arm based on the detected change. With these embodiments, the original point of the axis of the robot arm may be determined in an easy and effective manner without a need to mount a dedicated calibrating tool to the robot arm. Moreover, as no calibrating tool is needed, the potential errors that are caused in mounting and removing the calibrating tool may be eliminated.

In some embodiments of the present disclosure, detecting the change in the strength of the signal comprises: detecting any of a center and an extremity of a fluctuation in the strength of the signal. The output signal of the sensor may be a discrete signal or a continuous signal. If the signal is a discrete signal, the curve of the signal collected by the sensor usually shows a symmetric pattern during the movement of the robot arm, and the strength at the center of the fluctuation may indicate a greater change in the strength. Accordingly, the strength at the center of the fluctuation may reflect a typical position for the robot arm. Alternatively, if the signal is a continuous signal, then an extremity (such as a maximum or a minimum) of the fluctuation may indicate a greatest change in the strength. Accordingly, the strength at the extremity of the fluctuation may reflect a typical position for the robot arm. Therefore, these embodiments provide flexible manners in selecting the type of the sensor.

In some embodiments of the present disclosure, determining the original point of the axis further comprises: determining a position of the robot arm in the axis based on the center of the fluctuation, strength of the signal reaching a value corresponding to the center of the fluctuation when the robot arm moves to the determined position; and identifying the determined position as the original point of the axis. In some embodiments of the present disclosure, determining the original point of the axis further comprises: determining a position of the robot arm in the axis based on the extremity of the fluctuation, strength of the signal reaching a value corresponding to the extremity of the fluctuation when the robot arm moves to the determined position; and identifying the determined position as the original point of the axis. With these embodiments, the typical position when the robot arm moves to the position corresponding to the center or extremity of the fluctuation may be determined as the original point. This typical position will not change during movements of the robot arm and thus may be used as the original point for calibrating the robot arm.

In some embodiments of the present disclosure, the method may further comprise causing the robot arm to move in the axis. Once the robot system enters into the calibrating mode, the robot arm may be caused to move in the axis automatically and the original point may be determined without any further human control. With these embodiments, the determination of the original point may be implemented in an automatic manner after the robot system is set to a calibrating mode.

In some embodiments of the present disclosure, the sensor comprises an active sensor for transmitting a wave beam towards the reference mark and the robot arm; and the reference mark and the robot arm provide different reflectivity to the wave beam transmitted from the sensor. In some embodiments of the present disclosure, the sensor comprises a passive sensor; and the reference mark comprises a signal source for generating the signal that is to be collected by the sensor. With these embodiments, various types of sensors may be equipped in the robot system and therefore it may provide a much convenient way for selecting the type of the sensor according to a specific type of the robot arm.

In some embodiments of the present disclosure, the reference mark is equipped at a mechanical stop of the robot arm. As the mechanical stop of the robot arm is clamped at the end of the robot arm and provides a range limitation of the movement of the robot arm, equipping the reference mark at the mechanical stop may not affect normal movements of the robot arm. Further, the mechanical stop may provide more space for equipping the reference mark at the robot arm.

In some embodiments of the present disclosure, the method may further comprise calibrating the axis of the robot arm based on the determined original point. With these embodiments, the robot arm may be easily calibrated without any calibrating tool, and all the calibrating procedures may be implemented automatically without complicated human interactions.

In some embodiments of the present disclosure, the axis of the robot arm comprises any of: an axis of a movement axis of the robot arm; or an axis of a rotation axis of the robot arm. With these embodiments, multiple axes of the robot arm may be calibrated according to their corresponding original points. Further, the original points of the axes may be determined separately. In addition to and/or alternatively, the original point of one axis may be determined first and then the axis of the robot arm may be calibrated based on the determined original point. Then, the original point of the other axis may be determined for further calibrating.

In some embodiments of the present disclosure, the axis of the robot arm comprises one of an axis of a movement axis of the robot arm and an axis of a rotation axis of the robot arm. The method may further comprise: receiving, during a movement of the robot arm in a further axis of the robot arm, a further signal collected by the sensor; detecting a further change in strength of the further signal; and determining a further original point of the further axis of the robot arm based on the further change. With these embodiments, as the axis is already calibrated during determining the further original point of the further axis, the errors in the axis is already removed, and thus the further axis may be calibrated in a more accurate and effective way.

In a second aspect, example embodiments of the present disclosure provide an apparatus for managing a robot arm. The apparatus comprises: a receiving unit, configured to receive, during a movement of the robot arm in an axis of the robot arm, a signal collected by a sensor equipped at a frame of the robot arm; a detecting unit, configured to detect a change in strength of the received signal, the change being caused by an offset between a position of a reference mark equipped at the robot arm and a position of the sensor; and a determining unit, configured to determine an original point of the axis of the robot arm based on the detected change.

In some embodiments of the present disclosure, the detecting unit comprises: a fluctuation detecting unit, configured to detect any of a center and an extremity of a fluctuation in the strength of the signal comprise.

In some embodiments of the present disclosure, the determining unit comprises: a position determining unit, configured to determine a position of the robot arm in the axis based on any of the center and the extremity of the fluctuation, strength of the signal reaching a value corresponding to any of the center and the extremity of the fluctuation when the robot arm moves to the determined position; and an identifying unit, configured to identify the determined position as the original point of the axis.

In some embodiments of the present disclosure, the apparatus further comprises: a driving unit, configured to cause the robot arm to move in the axis.

In some embodiments of the present disclosure, the sensor comprises an active sensor for transmitting a wave beam towards the reference mark and the robot arm; and the reference mark and the robot arm provide different reflectivity to the wave beam transmitted from the sensor.

In some embodiments of the present disclosure, the sensor comprises a passive sensor; and the reference mark comprises a signal source for generating the signal that is to be collected by the sensor.

In some embodiments of the present disclosure, the reference mark is equipped at a mechanical stop of the robot arm.

In some embodiments of the present disclosure, the axis of the robot arm comprises any of: an axis of a movement axis of the robot arm; or an axis of a rotation axis of the robot arm.

In some embodiments of the present disclosure, the apparatus further comprises: a calibrating unit, configured to calibrate the axis of the robot arm based on the determined original point.

In some embodiments of the present disclosure, the axis of the robot arm comprises one of an axis of a movement axis of the robot arm and an axis of a rotation axis of the robot arm. The receiving unit is further configured to receive, during a movement of the robot arm in a further axis of the robot arm, a further signal collected by the sensor; the detecting unit is further configured to detect a further change in strength of the further signal; and the determining unit is further configured to determine a further original point of the further axis of the robot arm based on the further change.

In a third aspect, example embodiments of the present disclosure provide a system for managing a robot arm. The system comprises: a computer processor coupled to a computer-readable memory unit, the memory unit comprising instructions that when executed by the computer processor implements the method for managing a robot arm according to the first aspect of the present disclosure.

In a fourth aspect, example embodiments of the present disclosure provide a computer readable medium having instructions stored thereon, the instructions, when executed on at least one processor, cause the at least one processor to perform the method for managing a robot arm according to the first aspect of the present disclosure.

In a fifth aspect, example embodiments of the present disclosure provide a robot system. The robot system comprises: a robot arm configured to move in an axis of the robot arm; a reference mark equipped at the robot arm; a sensor equipped at a frame of the robot arm and configured to collect a signal, the signal having a change in strength that is caused by an offset between a position of the reference mark and the sensor during a movement of the robot arm in the axis of the robot arm.

In some embodiments of the present disclosure, the sensor comprises an active sensor for transmitting a wave beam towards the reference mark and the robot arm; and the reference mark and the robot arm provide different reflectivity for the wave beam transmitted from the sensor.

In some embodiments of the present disclosure, the sensor comprises a passive sensor; and the reference mark comprises a signal source for generating the signal that is to be collected by the sensor.

In some embodiments of the present disclosure, the reference mark is equipped at a mechanical stop of the robot arm.

In some embodiments of the present disclosure, the axis of the robot arm comprises any of: an axis of a movement axis of the robot arm; or an axis of a rotation axis of the robot arm.

In some embodiments of the present disclosure, the robot arm is caused to move in the axis.

In some embodiments of the present disclosure, the change in the strength is for determining an original point of the robot arm.

In some embodiments of the present disclosure, the change comprises a fluctuation in the strength of the signal, and a position of the robot arm in the axis corresponding to any of the center and the extremity of the fluctuation is determined as the original point, the strength of the signal reaching a value corresponding to any of the center and the extremity of the fluctuation when the robot arm moves to the position.

In some embodiments of the present disclosure, the robot arm is calibrated based on the original point of the robot arm.

In a sixth aspect, example embodiments of the present disclosure provide a robot managing system. The robot managing system comprises: a robot system according to the fifth aspect of the present disclosure; and an apparatus for managing the robot system according to the second aspect of the present disclosure.

DESCRIPTION OF DRAWINGS

FIGS. 7A and 7B illustrate schematic diagrams where the robot arm moves to different positions in the fourth axis of the robot system respectively in accordance with embodiments of the present disclosure;

FIG. 7C illustrates a schematic diagram of a curve of a signal collected by a sensor during a movement of the robot arm in the fourth axis in accordance with embodiments of the present disclosure;

Throughout the drawings, the same or similar reference symbols are used to indicate the same or similar elements.

DETAILED DESCRIPTION OF EMBODIMENTS

Figure 1:
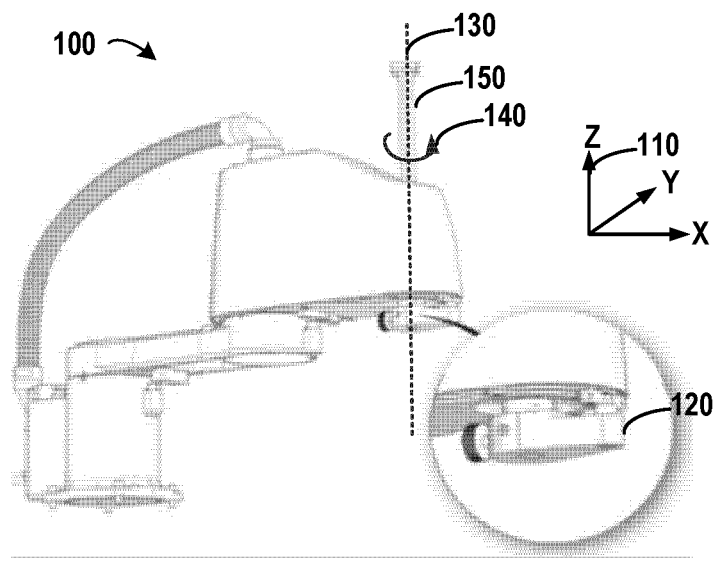
FIG. 1 illustrates a schematic diagram of a robot system comprising robot arm(s)

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

For the sake of description, reference will be made to FIG. 1 to provide a general description of environment in which embodiments of the present disclosure can be implemented. FIG. 1 illustrates a schematic diagram of a robot system 100 comprising robot arm(s). In FIG. 1, the robot system 100 may be a Selective Compliance Assembly Robot Arm (SCARA) robot system and may comprise multiple robot arms. Among those robot arms, a robot arm 150 may be an end arm to which a processing tool is mounted. During operations of the robot arm 150, a processing tool may be fixed to the end of the robot arm 150 for processing an object that is to be manufactured by the robot system 100. The position of the robot arm 150 should be calibrated before the processing. As shown in FIG. 1, the movement of the robot arm 150 may relates to two axes of the robot system 100: an axis 130 along which the robot arm 150 may vertically move; and an axis 140 around which the robot arm 150 may rotate.

In the SCARA robot system, the axis 130 may be referred to as the third axis and the axis 140 may be referred to as the fourth axis. Each of these axes 130 and 140 may have their own local coordinate systems and the local coordinate systems may be converted to a world coordinate system 110 based on corresponding converting matrixes. Although the present disclosure describes embodiments for managing the robot arm by taking the SCARA robot system as an example, the embodiments may be implemented in any type of robot systems as long as an original point of a robot arm needs to be determined.

There have been proposed solutions for managing a robot arm. According to one solution, a dedicated calibrating tool 120 may be fixed to the end of the robot arm 150, and then the axis 130 and the axis 140 of the robot arm 150 may be calibrated with the help of the calibrating tool 120. However, if a processing tool is already mounted to the robot arm 150, the calibrating procedure may involve multiple steps for removing and mounting the processing tool and the calibrating tool 120. On one hand, this procedure requires professional engineers' manual work. On the other hand, the frequent removing and mounting steps may possibly introduce assembly errors. Accordingly, it is desired to provide solutions for managing the robot arm in a much easier and convenient way.

Figure 2:
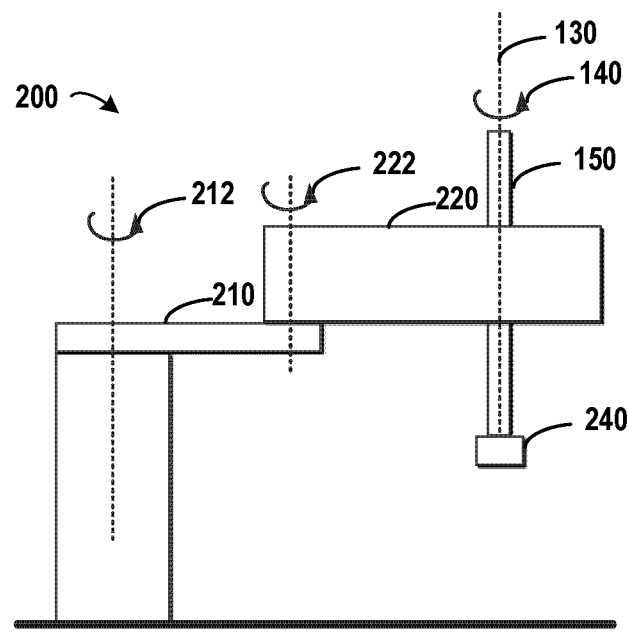
FIG. 2 illustrates a schematic diagram of a robot system in which embodiments of the present disclosure may be implemented.

In order to at least partially solve the above and other potential problems, a new solution for managing a robot arm is disclosed according to embodiments of the present disclosure. FIG. 2 illustrates a schematic diagram of a robot system 200 in which embodiments of the present disclosure may be implemented. In FIG. 2, the robot system 200 may comprise a robot arm 210, a robot arm 220, and a robot arm 150, where the robot arm 210 is connected to a base of the robot system 200, and the robot arm 220 is connected to the robot arm 210. As shown, the robot arm 210 may rotate around an axis 212 in the base of the robot system 200 and the robot arm 220 may rotate around an axis 222 in the robot arm 210. Further, a processing tool 240 may be mounted to the robot arm 150. Although three robot arms are shown in FIG. 2, more or less arms may be equipped in the robot system 200. According to embodiments of the present disclosure, the robot arm 150 may be managed without removing the processing tool 240.

Figure 3:
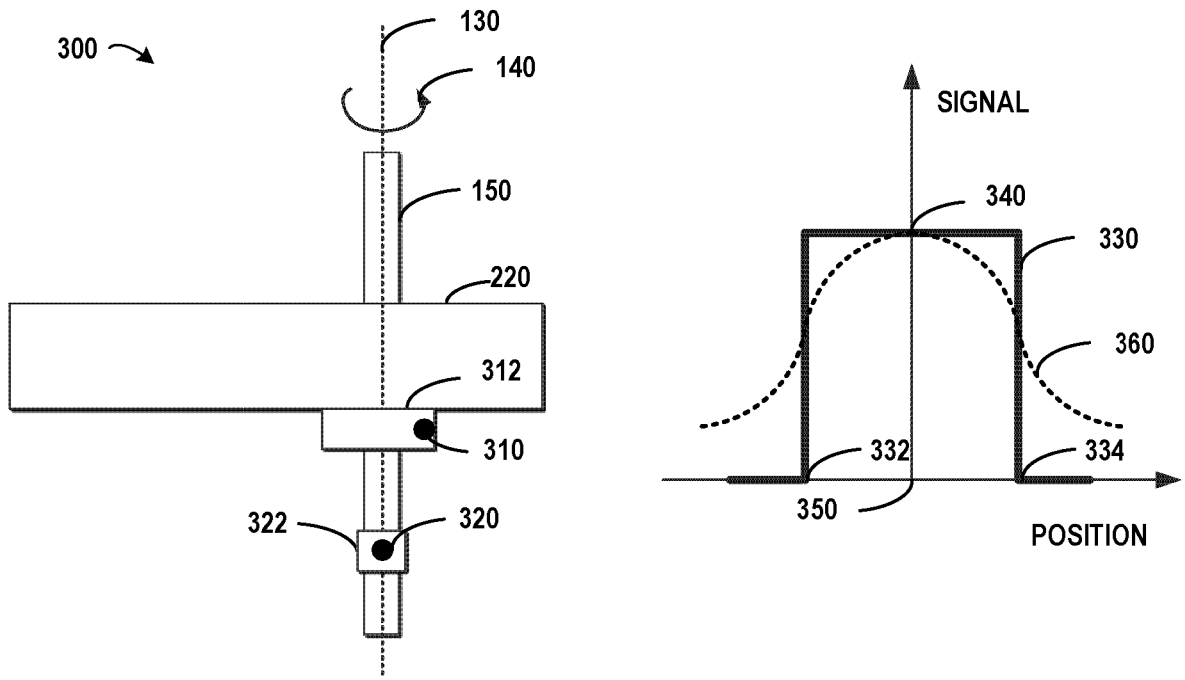
FIG. 3 illustrates a schematic diagram for managing a robot arm in accordance with embodiments of the present disclosure.

Reference will be made to FIG. 3 for a general description of the embodiments. FIG. 3 illustrates a schematic diagram 300 for managing the robot arm 150 in accordance with embodiments of the present disclosure. For the sake of simplicity, FIG. 3 illustrates only a portion of the robot system 200 and irrelevant portions the robot system 200 are omitted. The left side of FIG. 3 shows that the robot arm 150 may vertically move along the axis 130 and rotate round the axis 140. In embodiments of the present disclosure, a sensor 310 may be equipped at a frame 312 of the robot arm 150 and a reference mark 320 may be equipped at the robot arm 150. For example, the reference mark 320 may be mounted to a mechanical stop 322 of the robot arm 150. Alternatively, the reference mark 320 may be mounted to the robot arm 150 directly. The right side of FIG. 3 shows a curve of a signal that is collected by the sensor 310 during a movement of the robot arm 150. Here, the horizontal axis represents a position of the robot arm 150, and the vertical axis represents strength of the collected signal.

Base on the above, a new method for managing the robot arm 150 may be provided. In the method, during a movement of the robot arm 150 in an axis, a signal 330 collected by the sensor 310 equipped at the frame 312 of the robot arm 150 may be received. A change in strength of the received signal 330 may be detected from the signal 330, here the change is caused by an offset between a position of the reference mark 320 equipped at the robot arm 150 and a position of the sensor 310. An original point of the axis of the robot arm 150 may be determined based on the detected change. In some embodiments of the present disclosure, the collected signal may be a discrete signal as shown by the signal 330 in FIG. 3. In some embodiments, the collected signal may be a continuous signal as shown by the signal 360 in dash line.

With these embodiments, all the above steps may be implemented automatically without a need of manual work by the technical engineers. The original point of the axis of the robot arm 150 may be determined in an easy and effective manner without a need to mount a dedicated calibrating tool 120 to the robot arm 150. Moreover, as no calibrating tool is needed, the potential errors that are caused in mounting and removing the calibrating tool 120 may be eliminated. Comparing with the traditional solution for calibrating the robot arm 150 with the calibrating tool 120, the processing tool 240 does not need to be removed from the end of the robot arm 150 when the robot arm 150 is calibrated according to embodiments of the present disclosure.

Figure 4:
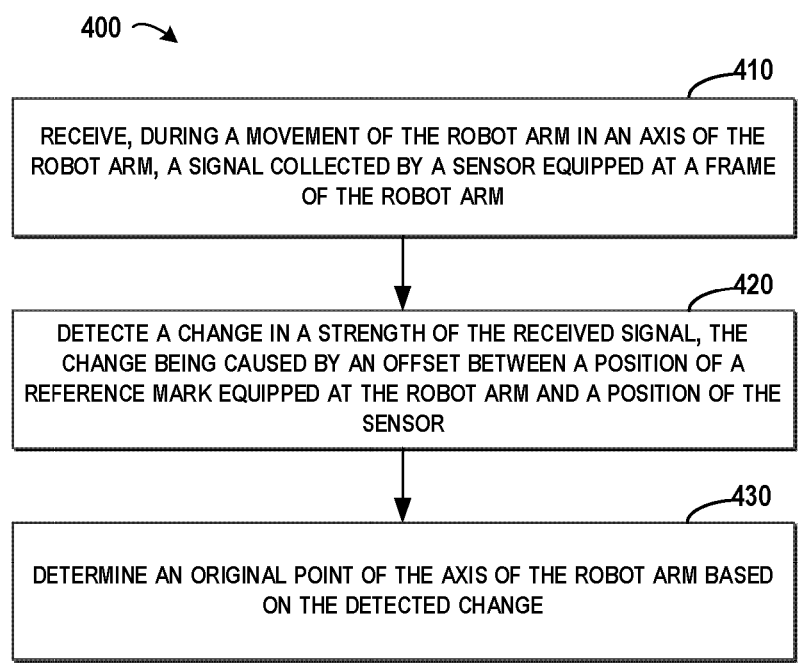
FIG. 4 illustrates a flowchart of a method for managing a robot arm in accordance with embodiments of the present disclosure.
Figure 5:
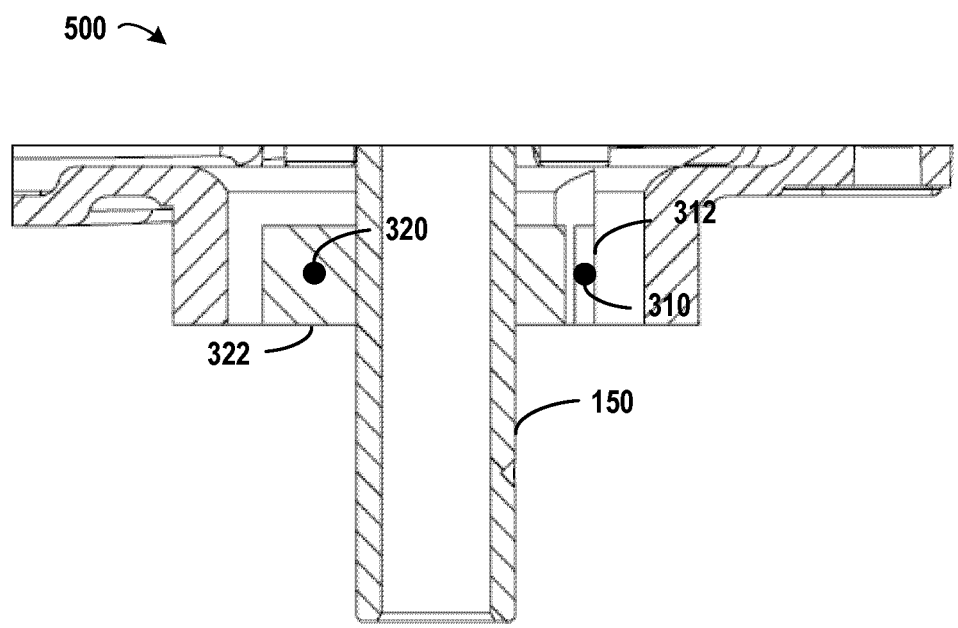
FIG. 5 illustrates a side view of a robot system equipped with a sensor and a reference mark in accordance with embodiments of the present disclosure.

Hereinafter, details of the embodiments of the present disclosure may be provided with reference to FIGS. 4 to 11. Reference will be made to FIG. 4, which illustrates a flowchart of a method 400 for managing the robot arm 150 in accordance with embodiments of the present disclosure. At a block 410 of FIG. 4, during the movement of the robot arm 150 in the axis (such as the axis 130 or 140) of the robot arm 150, the signal 330 collected by the sensor 310 equipped at the frame 312 of the robot arm 150 may be received. Reference will be made to FIG. 5 for positions for equipping the sensor 310 and the reference mark 320. FIG. 5 illustrates a side view 500 of the robot system 200 equipped with the sensor 310 and the reference mark 320 in accordance with embodiments of the present disclosure. As shown in FIG. 5, the sensor 310 may be fixed to the frame 312 of the robot arm 150. Here, the frame 312 may be a portion of the robot arm 220 to which the robot arm 150 is connected, and thus the relative position of the sensor 310 and the frame 312 remains unchanged during movement of the robot arm 150.

In some embodiments of the present disclosure, the sensor 310 may comprise various types of sensors. In one example, an active sensor may be adopted. The active sensor may transmit a wave beam towards the reference mark 320 and the robot arm 150, and collect signals reflected from the reference mark 320 and the robot arm 150. The reference mark 320 and the robot arm 150 may have difference shapes such that they may provide different reflectivity to the wave beam transmitted from the sensor 310. The active sensor may comprise a photoelectric sensor, a radar sensor and the like. In some embodiments, the wave beam may be a beam of any types of waves, including but not limited to an acoustic wave, a light wave, and a radio wave.

In some embodiments of the present disclosure, the sensor 310 may comprise a passive sensor. Here, the passive sensor does not transmit wave beam, instead, the passive sensor only receives signals from the reference mark 320. In these embodiments, the passive sensor works as a signal source for generating the signal that is to be collected by the sensor 310. The passive sensor may comprise a magnetic sensor for receiving a magnetic signal from a magnetic source, or another type of sensor for receiving another type of signal such as thermal signal and optical signal. With these embodiments, various types of sensors may be equipped in the robot system and therefore it may provide a much convenient way for selecting the sensor 310 according to a specific type of the robot arm 150.

In some embodiments of the present disclosure, the reference mark 320 may be equipped at the robot arm 150 directly. Although the reference mark 320 may shorten the stroke length reachable by the robot arm 150, these embodiments may provide an easy and effective way for determining the original point of the robot arm 150.

In some embodiments of the present disclosure, the reference mark 320 may be equipped at a mechanical stop 322 of the robot arm 150. Here, the mechanical stop 322 of the robot arm 150 may be a mechanical part clamped at the end of the robot arm 150 for providing a range limitation to the movement of the robot arm 150. With these embodiments, by equipping the reference mark 320 at the mechanical stop 322, the reference mark 320 may not affect the normal movement of the robot arm 150. Further, the robot arm 150 is usually implemented by a ball screw spline, and equipping the reference mark 320 at the mechanical stop 322 may not affect the stroke length of the robot arm 150.

In some embodiments of the present disclosure, the axis of the robot arm 150 may comprise any of: the axis 130 of a movement axis of the robot arm 150; or the axis 140 of a rotation axis of the robot arm 150. With these embodiments, multiple axes of the robot arm 150 may be calibrated according to the corresponding original points. Here, the original points of the axes may be determined separately, which may provide a convenient way for determining the original points. Alternatively, the original point of one axis may be determined and then this axis of the robot arm 150 may be calibrated first. Then, the original point of the other axis may be determined for further calibrating the other axis.

In some embodiments of the present disclosure, the method 400 may further comprise causing the robot arm 150 to move in the axis. With these embodiments, the calibrating may be implemented in an automatic manner after the robot system 200 is set to the calibrating mode. Once the robot system 200 enters into the calibrating mode, the robot arm 150 may be caused to move in the axis automatically without any further human control.

In some embodiments, the calibrating mode may be triggered once the robot system 200 is powered on. In some embodiments, the calibrating mode may be an independent mode and may be triggered by a technical engineer who is operating the robot system 200. In addition to and/or alternatively, the calibrating mode may be triggered in other situations. In the calibrating mode, the robot arm 150 may be manually moved to a predefined range within the movement range of the robot arm 150. Then, by moving the robot arm 150 within the predetermined range, the signal 330 near the center of the fluctuation may be collected and the original point of the axis may be determined. With these embodiments, the original point may be determined in a fast and effective manner.

Alternatively, in order to calibrate the robot arm 150, the robot arm 150 may be moved within the whole movement range of the robot arm 150 for determining the original point. In these embodiments, although it needs more time to reach the signal 330 near the center of the fluctuation, the whole calibrating process does not involve any manual interaction from the technical engineer and thus a full-automatic calibrating solution is provided.

At a block 420 of FIG. 4, a change may be determined in strength of the received signal 330. Here, the change may be caused by an offset between the position of the reference mark 320 equipped at the robot arm 150 and the position of the sensor 310. Referring back to the signal 330 in FIG. 3, the strength of the signal 330 varies according to the position of the robot arm 150. For the discrete signal 330, at a position 332, the strength changes from the minimum value to the maximum value, and at a position 334, the strength changes from the maximum value to the minimum value. At this point, the portion between the positions 332 and 334 may be determined as a change.

In some embodiments of the present disclosure, any of a center and an extremity of a fluctuation in the strength of the signal 330 may be determined. In the context of the present disclosure, the square wave in the signal 330 may indicate the fluctuation for the discrete signal; and an extremity in the curve of the signal 360 may indicate the fluctuation for the continuous signal. For the sake of simplicity, the present disclosure will take a peak in the square wave as an example of the fluctuation and describe details of the embodiments. All the steps for determining a center in a valley in the square wave, a maximum in a peak in the curve, and a minimum in a valley in the curve may be similar to those for processing a peak in the square wave.

As shown in FIG. 3, the peak occurs between the positions 332 and 334, and then a center 340 of the peak may be determined from the square wave. With these embodiments, as the signal 330 collected by the sensor usually shows a symmetric pattern during the movement of the robot arm 150, the strength at the center 340 of the peak may indicate a greater change in the strength. Accordingly, the original point determined based on the center 340 of the peak may be a relative accurate point.

Referring to a block 430 of FIG. 4, an original point of the axis of the robot arm 150 may be determined based on the detected change. Reference will be made to FIG. 3 again for providing details of how to determine the original point. In FIG. 3, in order to determine the original point, a position 350 corresponding to the center 340 may be determined from the curve of the signal 330. The strength of the signal 330 reaches a value corresponding to the center 340 of the peak when the robot arm 150 moves to the position 350. At this point, the determined position 350 may be identified as the original point of the axis. With these embodiments, the position 350 when the robot arm 150 moves to a position corresponding to the center 340 of the peak may be determined as the original point. The position 350 may accurately reflect an extreme point of the movement of the robot arm 150.

For a square wave signal 330 represented by discrete values, the position 350 may be a center of the positions 332 and 334. Referring to the continuous signal 360 represented by continuous values, as the continuous signal 360 may be affected by noise during operations of the sensor 310, the signal 360 may not show an exact symmetric pattern. At this point, the original point may be determined based on the extremity value in the continuous signal 360.

Figure 6A:
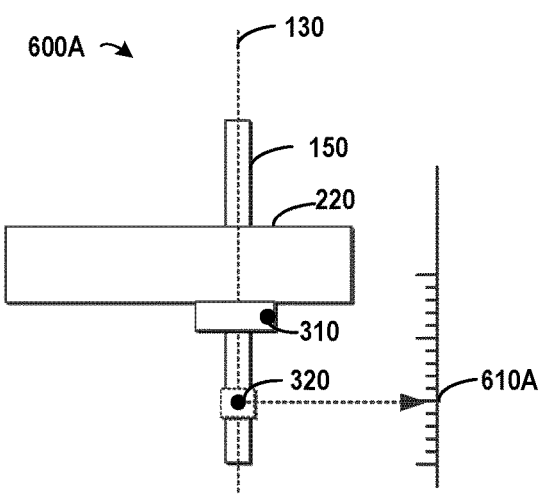
FIGS. 6A and 6B illustrate schematic diagrams where the robot arm moves to different positions in the third axis of the robot system respectively in accordance with embodiments of the present disclosure.
Figure 6B:
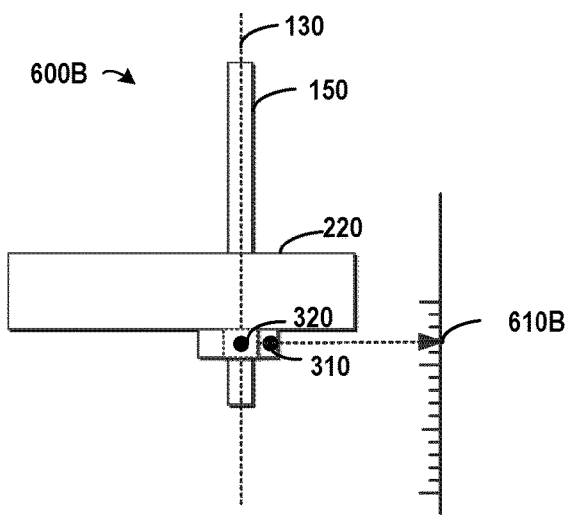
Figure 6C:
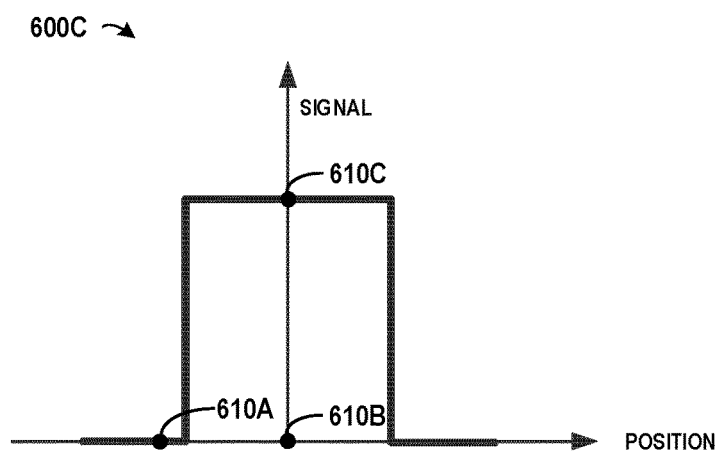
FIG. 6C illustrates a schematic diagram of a curve of a signal collected by a sensor during a movement of the robot arm in the third axis in accordance with embodiments of the present disclosure.

Hereinafter, reference will be made to FIGS. 6A, 6B and 6C for more details about how to determine the original point in the axis 130. FIGS. 6A and 6B illustrate schematic diagrams 600A and 600B where the robot arm 150 locates at different positions in the axis 130 respectively, and FIG. 6C illustrates a schematic diagram of a curve of a signal collected by a sensor during a movement of the robot arm 150.

In FIG. 6A, the robot arm 150 moves from the bottom to the top along the axis 130. When the reference mark 320 is located at a vertical position 610A, due to a fact that the reference mark 320 is relatively far from the sensor 310, the strength of the collected signal 330 at the position 610A indicates the minimum value. During the movement of the robot arm 150 from the bottom to the top, the strength of the collected signal 330 grows. FIG. 6B shows a situation when the reference mark 320 is located at a vertical position 610B. At this point, the reference mark 320 and the sensor 310 are in the same horizontal level and the reference mark 320 is closest to the sensor 310. Therefore the strength of the collected signal 330 at the position 610B indicates the maximum value. In FIG. 6C, the position 610B corresponds to the center 610C of the peak in the curve, and then the position 610B may be identified as the original point of the axis 130.

Hereinafter, reference will be made to FIGS. 7A, 7B and 7C for more details about how to determine the original point in the axis 140. FIGS. 7A and 7B illustrate schematic diagrams where the robot arm 150 locates at different positions in the axis 140 respectively, and FIG. 7C illustrates a schematic diagram of a curve of a signal collected by a sensor during a movement of the robot arm 150.

FIGS. 7A and 7B are top views 700A and 700B of the robot system 200, where the sensor 310 is located at the frame 312 of the robot arm 150, and the reference mark 320 is located at the robot arm 150. The robot arm 150 rotates clockwise around the axis 140. When the reference mark 320 is located at a position 710A (represented by an angle 710 defined by the positions of the reference mark 320, an axis center of the robot arm 150 and the sensor 310), due to a fact that the reference mark 320 is relatively far from the sensor 310, the strength of the collected signal 330 at the position 710A indicates the minimum value.

During the clockwise rotation of the robot arm 150, the strength of the collected signal grows. FIG. 7B shows a situation when the reference mark 320 is located at a position 710B. At this point, the above angle decreases to zero and the reference mark 320 and the sensor 310 are in the same direction and the reference mark 320 is closest to the sensor 310. Therefore the strength of the collected signal at the position 710B indicates the maximum value. In FIG. 7C, the position 710B corresponds to the center 710C of the peak in the curve, and then the position 710B may be identified as the original point of the axis 140.

Figure 8A:
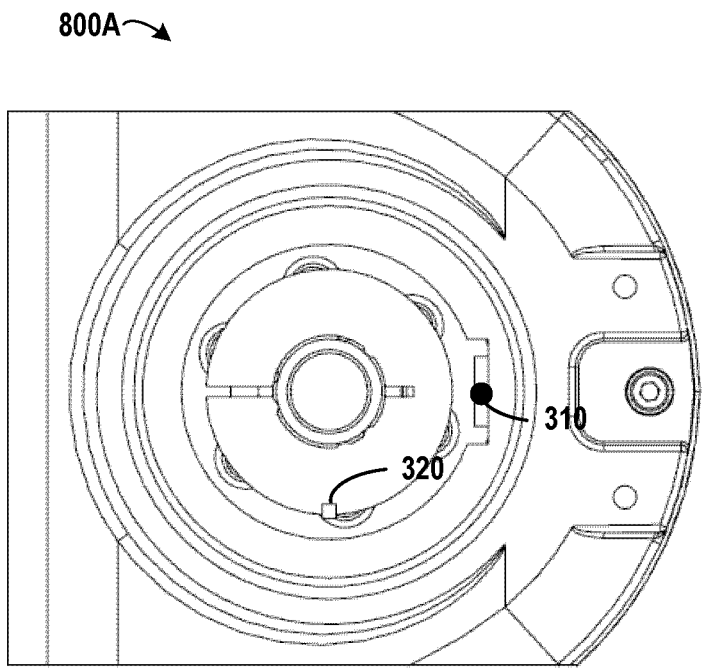
FIGS. 8A and 8B illustrate top views of a robot system equipped with a passive sensor where the robot arm moves to different position in the fourth axis of the robot system in accordance with embodiments of the present disclosure.
Figure 8B:
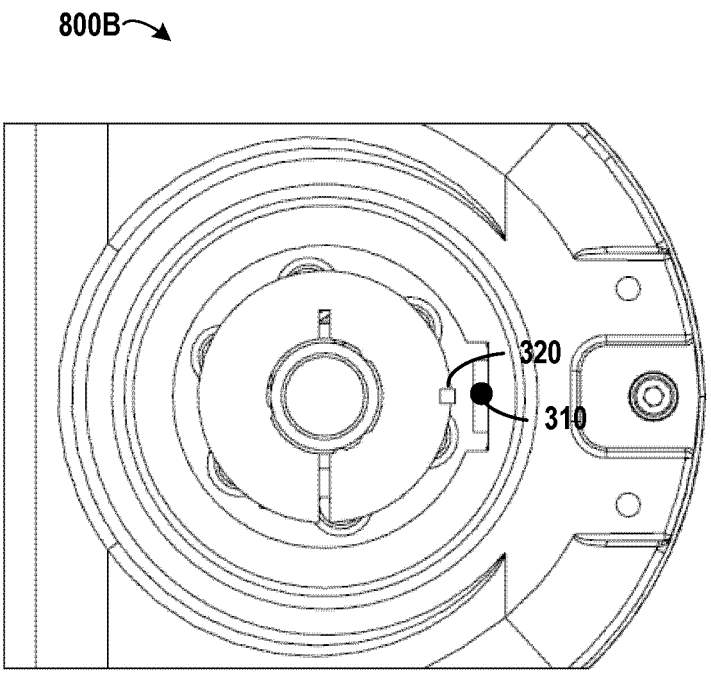

As mentioned in the above paragraphs, multiple types of sensors 310 may be adopted, hereinafter, reference will be made to FIGS. 8A and 8B for describing how to determine the original point by using a passive sensor such as a magnetic sensor. FIGS. 8A and 8B illustrate top views 800A and 800B of the robot system 200 equipped with a passive sensor, and the robot arm 150 moves to different positions in the axis 140 of the robot system 200 in FIGS. 8A and 8B. In these figures, the sensor 310 may be a magnetic sensor and the reference mark 320 maybe a magnetic source. When the reference mark 320 is located far from the sensor 310 as shown in FIG. 8A, the collected signal 330 may represent a minimum value. When the reference mark 320 is located close to the sensor 310 as shown in FIG. 8B, the collected signal 330 may represent a maximum value. At this point, the position of the robot arm 150 as shown in FIG. 8B may be determined as the original point of the axis 140.

Figure 9A:
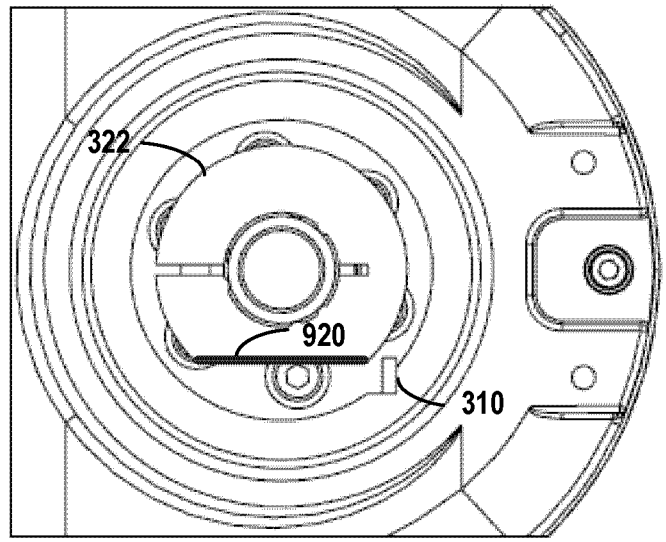
FIGS. 9A and 9B illustrate top views of the robot system equipped with an active sensor where the robot arm moves to different position in the fourth axis of the robot system in accordance with embodiments of the present disclosure.
Figure 9B:
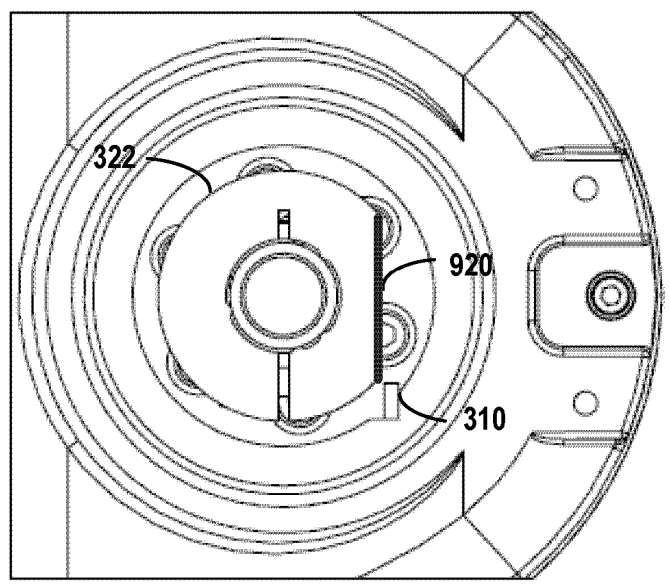

Hereinafter, reference will be made to FIGS. 9A and 9B for describing how to determine the original point by using an active sensor such as a photoelectric sensor. FIGS. 9A and 9B illustrate top views 900A and 900B of the robot system 200 equipped with an active sensor, and the robot arm 150 moves to different positions in the axis 140 of the robot system 200 in FIGS. 9A and 9B, respectively. In these figures, the sensor 310 may be a photoelectric sensor and the reference mark 320 maybe be shaped to a different pattern other than the robot arm 150.

In FIGS. 9A and 9B, the mechanical stop 322 may be shaped to form a plane 920 in a cylinder of the mechanical stop 322. Here, the plane 920 may serve as the reference mark 320. When the plane 920 is located far from the sensor 310 as shown in FIG. 9A, the wave beam transmitted from the sensor 310 is reflected by the cylinder of the mechanical stop 322, the collected signal 330 may represent a larger value. When the plane 920 is located in parallel with the wave beam transmitted from the sensor 310 as shown in FIG. 9B, the wave beam goes through a long distant and the collected signal 330 may change to a small value. In these embodiments, the curve shows a valley during the movement. At this point, the position of the robot arm 150 as shown in FIG. 9B may be determined as the original point of the axis 140.

In some embodiments of the present disclosure, once the original point is determined, the axis of the robot arm 150 may be calibrated based on the determined original point. With these embodiments, the robot arm 150 may be easily calibrated without any calibrating tool, and all the calibrating procedures may be implemented by a processor for performing programmable instructions.

In some embodiments of the present disclosure, the original points of the axes 130 and 140 may be determined independently. Any of the axes 130 and 140 may be determined first, and then the original point of the other axis may be determined. In some embodiments of the present disclosure, the original point of one axis may be determined and axis of the robot arm 150 may be calibrated first. Then, the original point of the other axis may be determined based on the method 400 of the present disclosure. With these embodiments, as the axis is already calibrated during determining the further original point of the further axis, the errors in the axis is already removed during the further calibrating. Therefore, the further axis may be calibrated in a more accurate and effective way.

Figure 10:
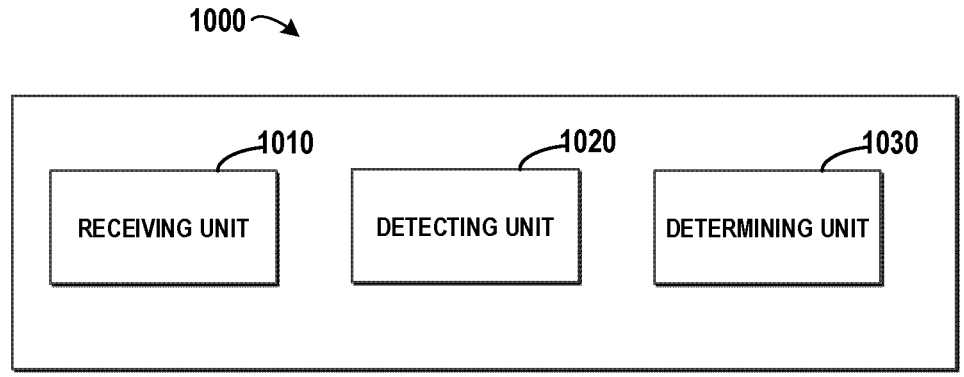
FIG. 10 illustrates a schematic diagram of an apparatus for managing a robot arm in accordance with embodiments of the present disclosure.

In some embodiments of the present disclosure, an apparatus 1000 for managing the robot arm 150 is provided. FIG. 10 illustrates a schematic diagram of an apparatus 1000 for managing a robot arm in accordance with embodiments of the present disclosure. As illustrated in FIG. 10, the apparatus 1000 may comprise: a receiving unit 1010, configured to receive, during a movement of the robot arm 150 in an axis of the robot arm 150, a signal 330 collected by a sensor equipped at a frame of the robot arm; a detecting unit 1020, configured to detect a change in strength of the received signal, the change being caused by an offset between a position of a reference mark equipped at the robot arm and a position of the sensor; and a determining unit 1030, configured to determine an original point of the axis of the robot arm based on the detected change.

In some embodiments of the present disclosure, the detecting unit 1020 comprises: a fluctuation detecting unit, configured to detect any of a center and an extremity of a fluctuation in the strength of the signal comprise.

In some embodiments of the present disclosure, the determining unit 1020 comprises: a position determining unit, configured to determine a position of the robot arm in the axis based on any of the center and the extremity of the fluctuation, strength of the signal reaching a value corresponding to any of the center and the extremity of the fluctuation when the robot arm moves to the determined position; and an identifying unit, configured to identify the determined position as the original point of the axis.

In some embodiments of the present disclosure, the apparatus 1000 further comprises: a driving unit, configured to cause the robot arm to move in the axis.

In some embodiments of the present disclosure, the sensor comprises an active sensor for transmitting a wave beam towards the reference mark and the robot arm; and the reference mark and the robot arm provide different reflectivity to the wave beam transmitted from the sensor.

In some embodiments of the present disclosure, the sensor comprises a passive sensor; and the reference mark comprises a signal source for generating the signal that is to be collected by the sensor.

In some embodiments of the present disclosure, the reference mark is equipped at a mechanical stop of the robot arm.

In some embodiments of the present disclosure, the axis of the robot arm comprises any of: an axis of a movement axis of the robot arm; or an axis of a rotation axis of the robot arm.

In some embodiments of the present disclosure, the apparatus 1000 further comprises: a calibrating unit, configured to calibrate the axis of the robot arm based on the determined original point.

In some embodiments of the present disclosure, the axis of the robot arm comprises one of an axis of a movement axis of the robot arm and an axis of a rotation axis of the robot arm. The receiving unit 1010 is further configured to receive, during a movement of the robot arm in a further axis of the robot arm, a further signal collected by the sensor; the detecting unit 1020 is further configured to detect a further change in strength of the further signal; and the determining unit 1030 is further configured to determine a further original point of the further axis of the robot arm based on the further change.

Figure 11:
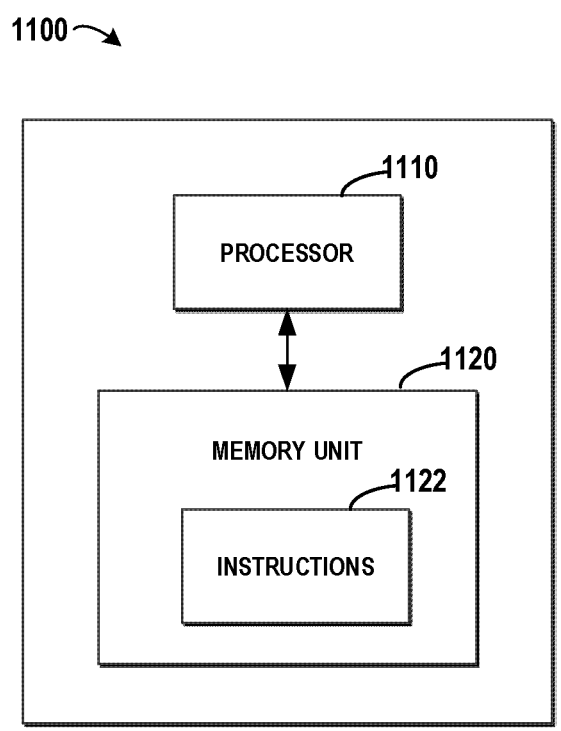
FIG. 11 illustrates a schematic diagram of a system for managing a robot arm in accordance with embodiments of the present disclosure.

In some embodiments of the present disclosure, a system 1100 for managing a robot arm is provided. FIG. 11 illustrates a schematic diagram of a system 1100 for managing a robot arm in accordance with embodiments of the present disclosure. As illustrated in FIG. 11, the system 1100 may comprise a computer processor 1110 coupled to a computer-readable memory unit 1120, and the memory unit 1120 comprises instructions 1122. When executed by the computer processor 1110, the instructions 1122 may implement the method for managing a robot arm as described in the preceding paragraphs, and details will be omitted hereinafter.

In some embodiments of the present disclosure, a computer readable medium for managing a robot arm is provided. The computer readable medium has instructions stored thereon, and the instructions, when executed on at least one processor, may cause at least one processor to perform the method for managing a robot arm as described in the preceding paragraphs, and details will be omitted hereinafter.

In some embodiments of the present disclosure, a robot system is provided. The robot system 200 comprises: a robot arm configured to move in an axis of the robot arm; a reference mark equipped at the robot arm; a sensor equipped at a frame of the robot arm and configured to collect a signal, the signal having a change in strength that is caused by an offset between a position of the reference mark and the sensor during a movement of the robot arm in the axis of the robot arm.

In some embodiments of the present disclosure, the sensor comprises an active sensor for transmitting a wave beam towards the reference mark and the robot arm; and the reference mark and the robot arm provide different reflectivity for the wave beam transmitted from the sensor.

In some embodiments of the present disclosure, the sensor comprises a passive sensor; and the reference mark comprises a signal source for generating the signal that is to be collected by the sensor.

In some embodiments of the present disclosure, the reference mark is equipped at a mechanical stop of the robot arm.

In some embodiments of the present disclosure, the axis of the robot arm comprises any of: an axis of a movement axis of the robot arm; or an axis of a rotation axis of the robot arm.

In some embodiments of the present disclosure, the robot arm is caused to move in the axis.

In some embodiments of the present disclosure, the change in the strength is for determining an original point of the robot arm.

In some embodiments of the present disclosure, the change comprises a fluctuation in the strength of the signal, and a position of the robot arm in the axis corresponding to any of a center and an extremity of the fluctuation is determined as the original point, the strength of the signal reaching a value corresponding to any of the center and the extremity of the fluctuation when the robot arm moves to the position.

In some embodiments of the present disclosure, the robot arm is calibrated based on the original point of the robot arm.

In some embodiments of the present disclosure, a robot managing system is provided. The robot managing system comprises: a robot system according to the present disclosure; and an apparatus for managing the robot system according to embodiments of the present disclosure.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a robot arm, the method comprising:
   receiving, during a movement of the robot arm in an axis of the robot arm, a signal collected by a sensor equipped at a frame of the robot arm;
   detecting any of a center and an extremity of a fluctuation in strength of the received signal, the fluctuation in the strength of the received signal being caused by an offset between a position of a reference mark equipped at the robot arm and a position of the sensor equipped at the frame of the robot arm;
   determining an original point of the axis of the robot arm based on the detected center and/or the extremity of the fluctuation in the strength of the received signal; and
   calibrating the axis of the robot arm based on the determined original point.

2. The method of claim 1, wherein determining the original point of the axis further comprises:
   determining a position of the robot arm in the axis based on any of the center and the extremity of the fluctuation, the strength of the signal reaching a value corresponding to any of the center and the extremity of the fluctuation when the robot arm moves to the determined position; and
   identifying the determined position as the original point of the axis.

3. The method of claim 1, further comprising: causing the robot arm to move in the axis.

4. The method of claim 1, wherein:
   the sensor comprises an active sensor configured to transmit a wave beam towards the reference mark and the robot arm; and
   the reference mark and the robot arm provide different reflectivity for the wave beam transmitted from the sensor.

5. The method of claim 1, wherein:
   the sensor comprises a passive sensor; and
   the reference mark comprises a signal source configured to generate the signal that is to be collected by the sensor.

6. The method of claim 1, wherein the reference mark is equipped at a mechanical stop of the robot arm.

7. The method of claim 1, wherein the axis of the robot arm comprises any of:
   an axis of a movement axis of the robot arm; or
   an axis of a rotation axis of the robot arm.

8. The method of claim 1, wherein the axis of the robot arm comprises one of an axis of a movement axis of the robot arm and an axis of a rotation axis of the robot arm; and
   the method further comprises:
      receiving, during a movement of the robot arm in a further axis of the robot arm, a further signal collected by the sensor;
      detecting a further change in strength of the further signal; and
      determining a further original point of the further axis of the robot arm based on the further change.

9. An apparatus for managing a robot arm, the apparatus comprising a processor configured to:
   receive, during a movement of the robot arm in an axis of the robot arm, a signal collected by a sensor equipped at a frame of the robot arm;
   detect any of a center and an extremity of a fluctuation in strength of the received signal, the fluctuation in the strength of the received signal being caused by an offset between a position of a reference mark equipped at the robot arm and a position of the sensor equipped at the frame of the robot arm;
   determine an original point of the axis of the robot arm based on the detected center and/or the extremity of the fluctuation in the strength of the received signal; and
   calibrate the axis of the robot arm based on the determined original point.

10. The apparatus of claim 9, wherein the processor is further configured to:
    determine a position of the robot arm in the axis based on any of the center and the extremity of the fluctuation, the strength of the signal reaching a value corresponding to any of the center and the extremity of the fluctuation when the robot arm moves to the determined position; and
    identify the determined position as the original point of the axis.

11. The apparatus of claim 9, further comprising:
    a driver configured to cause the robot arm to move in the axis.

12. The apparatus of claim 9, wherein:
    the sensor comprises an active sensor configured to transmit a wave beam towards the reference mark and the robot arm; and
    the reference mark and the robot arm provide different reflectivity to the wave beam transmitted from the sensor.

13. The apparatus of claim 9, wherein:
    the sensor comprises a passive sensor; and
    the reference mark comprises a signal source configured to generate the signal that is to be collected by the sensor.

14. The apparatus of claim 9, wherein the reference mark is equipped at a mechanical stop of the robot arm.

15. The apparatus of claim 9, wherein the axis of the robot arm comprises any of:
    an axis of a movement axis of the robot arm; or
    an axis of a rotation axis of the robot arm.

16. The apparatus of claim 9, wherein the axis of the robot arm comprises one of an axis of a movement axis of the robot arm and an axis of a rotation axis of the robot arm; and
    the processor is further configured to:
       receive, during a movement of the robot arm in a further axis of the robot arm, a further signal collected by the sensor;
       detect a further change in strength of the further signal; and
       determine a further original point of the further axis of the robot arm based on the further change.

17. A system for managing a robot arm, comprising: a computer processor coupled to a computer memory, the computer memory comprising instructions stored thereon that when executed by the computer processor causing performance of the method of claim 1.

18. A non-transitory computer readable medium having instructions stored thereon, the instructions, when executed on at least one processor, cause the at least one processor to perform the method of claim 1.

19. A robot managing system, comprising:
a robot system comprising:
- a robot arm configured to move in an axis of the robot arm;
- a reference mark equipped at the robot arm;
- a sensor equipped at a frame of the robot arm and configured to collect a signal, the signal having a change in strength that is caused by an offset between a position of the reference mark and the sensor during a movement of the robot arm in the axis of the robot arm; and an apparatus for managing the robot system, the apparatus comprising a processor configured to:
- receive, during the movement of the robot arm in the axis of the robot arm, the signal collected by the sensor equipped at the frame of the robot arm;
- detect any of a center and an extremity of a fluctuation in strength of the received signal;
- determine an original point of the axis of the robot arm based on the detected center and/or the extremity of the fluctuation in the strength of the received signal; and
- calibrate the axis of the robot arm based on the determined original point.

20. The robot managing system of claim 19, wherein:
the sensor comprises a passive sensor; and
the reference mark comprises a signal source configured to generate the signal that is to be collected by the sensor.

21. The robot managing system of claim 19, wherein the reference mark is equipped at a mechanical stop of the robot arm.

22. The robot managing system of claim 19, wherein the axis of the robot arm comprises any of:
an axis of a movement axis of the robot arm; or
an axis of a rotation axis of the robot arm.

23. The robot managing system of claim 19, wherein the robot arm is caused to move in the axis.

24. The robot managing system of claim 19, wherein:
the sensor comprises an active sensor configured to transmit a wave beam towards the reference mark and the robot arm; and
the reference mark and the robot arm provide different reflectivity for the wave beam transmitted from the sensor.

* * * * *